(12) United States Patent
Smith et al.

(10) Patent No.: US 7,646,110 B2
(45) Date of Patent: Jan. 12, 2010

(54) VOLTAGE MONITORING

(75) Inventors: David E. Smith, Vancouver, WA (US); Kenneth B. Wade, Battle Ground, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 457 days.

(21) Appl. No.: 11/552,342

(22) Filed: Oct. 24, 2006

(65) Prior Publication Data

US 2008/0106255 A1 May 8, 2008

(51) Int. Cl.
*H02J 3/06* (2006.01)
(52) U.S. Cl. .......................... 307/34; 307/31

(58) Field of Classification Search ............... 307/125, 307/31, 33, 34, 38, 64, 66; 315/307
See application file for complete search history.

(56) References Cited

U.S. PATENT DOCUMENTS

| | | | | |
|---|---|---|---|---|
| 3,906,362 A | * | 9/1975 | Morris et al. | 324/113 |
| 6,320,351 B1 | * | 11/2001 | Ng et al. | 320/104 |
| 6,828,914 B2 | * | 12/2004 | Zur et al. | 340/636.1 |
| 7,221,977 B1 | * | 5/2007 | Weaver et al. | 607/29 |
| 7,382,101 B2 | * | 6/2008 | Fukuda et al. | 315/308 |

OTHER PUBLICATIONS

Analog Devices ADE7753 specification sheet, copyright 2004.

* cited by examiner

*Primary Examiner*—Albert W Paladini

(57) ABSTRACT

Embodiments of voltage monitoring are disclosed.

13 Claims, 5 Drawing Sheets

FIG 3B

VOLTAGE MONITORING

BACKGROUND

Many types of electronic devices, such as image-formation devices like inkjet and laser printers, are intended to operate from alternating current (AC) provided by AC mains. For instance, such devices plug into wall outlets, which interconnect the devices to the AC mains providing the AC. AC mains provide nominal voltage, such as 120 volts, within a given tolerance level, such as +6% and -10%. In actuality, however, the voltage provided can be substantially greater or less than the nominal voltage. Deviation of the voltage provided by the AC mains outside of the tolerance level can result in operation of the electronic devices coupled to the AC mains in an undesired manner.

DETAILED DESCRIPTION

Figure 1:
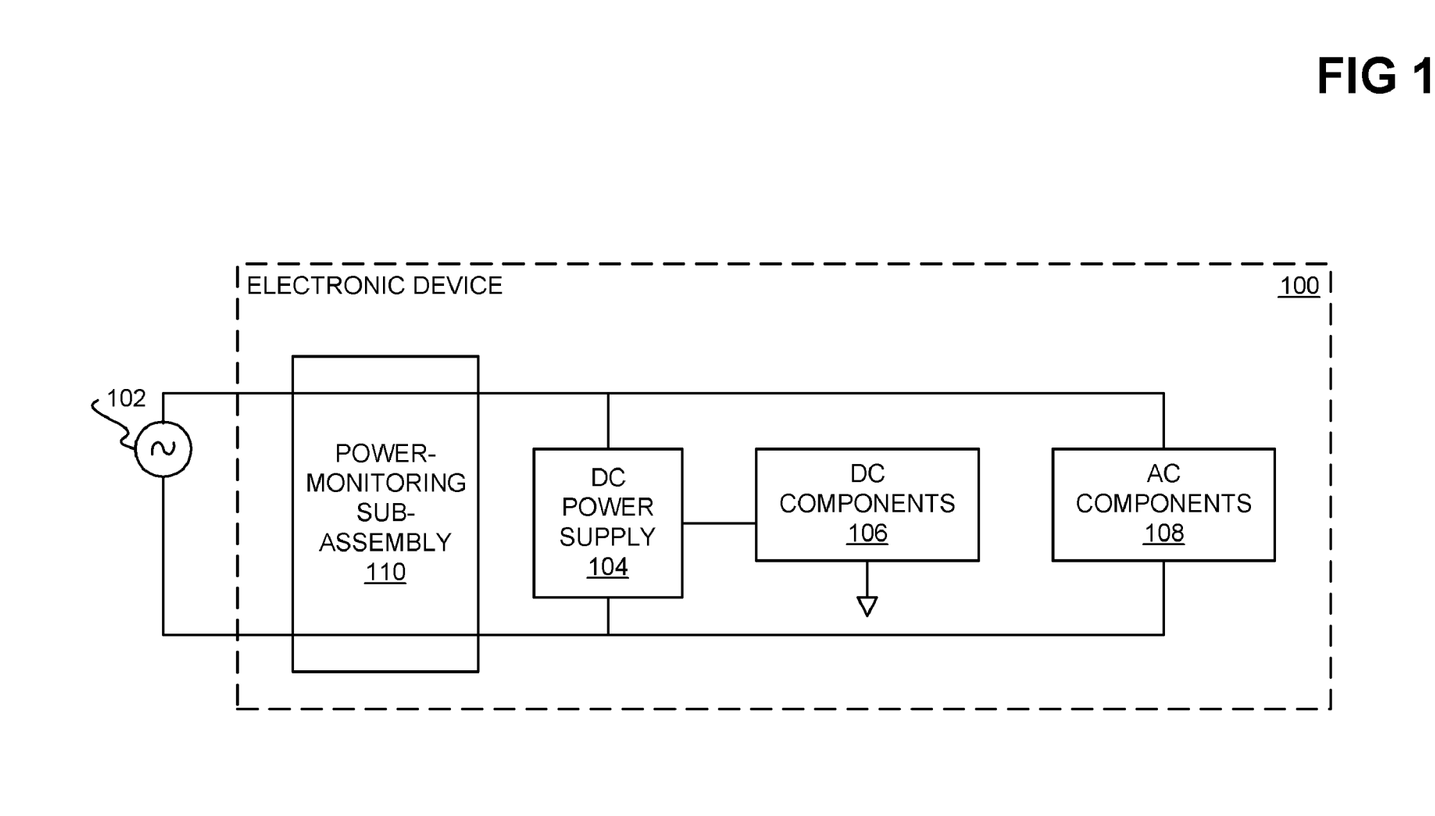
FIG. 1 is a diagram of a representative electronic device interconnected to alternating current (AC) mains, according to an embodiment of the present disclosure.

FIG. 1 shows a representative electronic device 100, according to an embodiment of the present disclosure. The electronic device 100 may be an image-forming device, such as an inkjet or a laser printer, or another type of electronic device. The electronic device 100 is connected to alternating current (AC) mains 102, which provide power by which the electronic device 100 operates. For example, the electronic device 100 may be plugged into a wall outlet to which the AC mains 102 are interconnected.

The electronic device 100 includes a direct current (DC) power supply 104, one or more DC components 106, one or more AC components 108, and a power-monitoring sub-assembly 110. As can be appreciated by those of ordinary skill within the art, the electronic device 100 may include other components and/or mechanisms, in addition to those depicted in FIG. 1. The DC power supply 104 converts AC provided by the AC mains 102 to DC by which the DC components 106 operate. The DC components 106 generally are the lower power-consuming components of the electronic device 100. For example, where the electronic device 100 is an image-forming device, the DC components 106 can include various motors, semiconductor devices, and so on, that are typical within such an image-forming device.

By comparison, the AC components 108 operate by AC from the AC mains 102, as opposed to DC converted from the AC by the DC power supply 104. The AC components 108 generally are the higher power-consuming components of the electronic device 100. For example, where the electronic device 100 is an image-forming device, the AC components 108 can include the fuser, where the device 100 is a laser printer, as well as the ink dryer and/or the media hold-down vacuum, where the device 100 is an inkjet printer.

The power-monitoring sub-assembly 110 monitors the AC mains current, the AC mains voltage, and/or the AC mains power provided by the AC mains 102 to manage the power used by the DC components 106 and the AC components 108. In general, the sub-assembly 110 may sample the AC voltage, the AC current, and the AC power a predetermined number of times per second, average the sampled AC voltage, the sampled AC current, and the sampled AC power, and based thereon manage power usage by the components 106 and 108. For instance, if it appears that the components 106 and 108 are causing the AC voltage to slowly sag, the sub-assembly 110 may decrease the power used by one or more of the components 106 and 108 so that the AC voltage does not sag too much.

The power-monitoring sub-assembly 110 also continuously, during operation, monitors the AC voltage for decreases in the AC voltage that occur without warning, as may result, for instance, due to the AC voltage supplied by the AC mains 102 suddenly dropping. The monitoring by the sub-assembly 110 is continuous during operation in that while the electronic device 100 is operating, and has not been shut off or turned off (or otherwise is not operating), the sub-assembly 110 continuously monitors the AC voltage. Thus, when the device 100 is not operating, such as when it has been shut off or turned off, the sub-assembly 110 does not monitor the AC voltage. The monitoring of the AC voltage, in other words, is continuous as opposed to the AC voltage being sampled at discrete times, but when the device 100 is not operating, the AC voltage is not monitored at all.

The sub-assembly 110 issues an interrupt where the AC mains voltage drops below a threshold more than a predetermined number of times. In one embodiment, the sub-assembly 110 may specifically an interrupt where the AC mains voltage drops below a threshold more than a predetermined number of times in a row. In another rembodiment, the sub-assembly 110 may specifically issue an interrupt where the AC mains voltage drops below a threshold more than a predetermined number of times within a given period of time. In response, the sub-assembly 110 may greatly decrease the power used by one or more of the components 106 and 108 so that the electronic device 100 is still able to operate. For example, the sub-assembly 110 may turn off one or more of the AC components 108, which generally consume more power than the DC components 106 do.

The power-monitoring sub-assembly 110 sampling AC voltage, AC current, and/or AC power to manage power usage by the DC components 106 and the AC components 108, and continuously monitoring the AC voltage to ensure that the electronic device 100 is able to operate, provides for advantages over the prior art. For instance, if the sub-assembly 110 were just to sample AC voltage and AC power, and not continuously monitor the AC voltage, the sub-assembly 110 may not be able to react to at least substantially instantaneous changes in the AC voltage provided by the AC mains 102. For example, if the AC mains voltage drops significantly enough and quickly enough, the sampling of the AC voltage by the sub-assembly 110 may not be able to react quickly enough to reduce power usage by the components 106 and 108. The result can be that the electronic device 100 ungracefully stops operating, because it is attempting to use more power than the AC mains 102 can provide.

By comparison, by also continuously monitoring the AC voltage, the power-monitoring sub-assembly 110 substantially reduces the likelihood that this situation will occur. That is, if the AC mains voltage drops significantly and quickly, the continuous monitoring of the AC voltage by the sub-assembly 110 can enable the sub-assembly 110 to turn off one or more of the components 106 and 108. The electronic device 100 still remains operable, insofar as there is sufficient AC voltage to power a bare minimum of the components 106 and 108. Thus, the electronic device 100 does not ungracefully stop operating, because the sub-assembly 110 is able to cause it to use less power than the AC mains 102 can provide.

Figure 2:
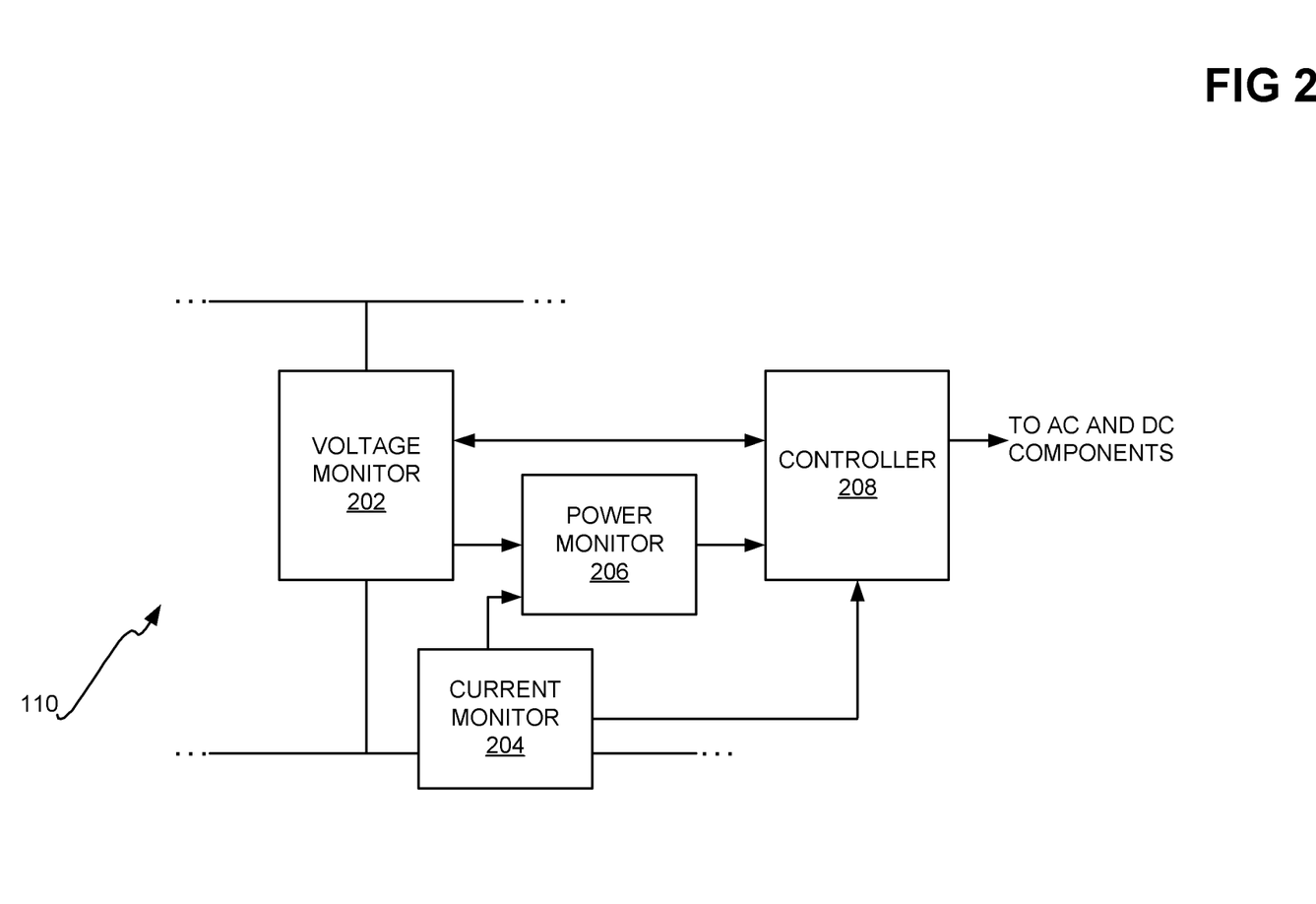
FIG. 2 is a diagram of a power-monitoring sub-assembly for an electronic device, according to an embodiment of the present disclosure.

FIG. 2 shows the power-monitoring sub-assembly 110 in more detail, according to an embodiment of the present disclosure. The sub-assembly 110 includes a voltage monitor 202, a current monitor 204, a power monitor 206, and a controller 208. As can be appreciated by those of ordinary skill within the art, the power-monitoring sub-assembly 110 may further include other components and/or mechanisms, in addition to and/or in lieu of those depicted in FIG. 2. In one specific embodiment, the monitors 202, 204, and 206 are implemented as a single integrated circuit (IC). An example of such an IC is single-phase multifunction metering IC, part number ADE7753, available from Analog Devices, Inc., of Norwood, Mass.

The voltage monitor 202 is an AC mains voltage monitor that continuously monitors the AC mains voltage provided by the AC mains 102. Where the AC mains voltage drops below a threshold more than a predetermined number of times, the voltage monitor 202 issues an interrupt to the controller 208. The communication between the voltage monitor 202 and the controller 208 may be bidirectional, such that the controller 208 provides the threshold and the predetermined number of times against which the monitor 202 monitors the AC mains voltage. Furthermore, the controller 208 may receive sampled AC mains voltage a predetermined number of times per second from the voltage monitor 202. The voltage monitor 202 is also in one embodiment unidirectionally connected to the power monitor 206, providing the power monitor 206 with the value of the AC mains voltage.

The current monitor 204 is an AC mains current monitor that monitors the AC mains current provided by the AC mains 102. In one embodiment, the current monitor 204 is unidirectionally connected to the power monitor 206 and the controller 208, providing the power monitor 206 and the controller 208 with the value of the AC mains current. The power monitor 206 is an AC mains voltage monitor that monitors the AC mains voltage provided by the AC mains 102. The power monitor 206 achieves this functionality by receiving the value of the AC mains current from the current monitor 206 and the value of the AC mains voltage from the voltage monitor 206, and based on these two values, determining AC mains power as current times voltage. The controller 208 may receive sampled AC mains power a predetermined number of times per second from the power monitor 202 over a unidirectional connection from the power monitor 206 to the controller 208. Likewise, the controller 208 may receive sampled AC mains current a predetermined number of times per second from the current monitor 204 over a unidirectional connection from the current monitor 204 to the controller 208. In general, the power monitor 206 and the current monitor 204 are discrete sampled data systems, whereas the voltage monitor 202 is a substantially continuous data system. The controller 208 discretely samples data as generated by the monitors 202, 204, and 206. That is, even though the voltage monitor 202 is able to generate data at least substantially continuously, the controller 208 may just be able to discretely sample this data a predetermined number of times per second.

The controller 208 may be implemented in software, hardware, or a combination of software and hardware. Based on the sampled AC mains voltage received a predetermined number of times per second from the voltage monitor 202, and/or on the sampled AC mains power received a predetermined number of times per second from the power monitor 206, the controller 208 manages the power used by the DC components 106 and the AC components 108. In an additional embodiment, such power management may also be based on the sampled AC mains current received a predetermined number of times per second from the current monitor 204.

For example, the sampled values of the AC mains voltage, the AC mains current and/or the AC mains power may be used by the controller 208 to determine whether the AC mains 102 is able to provide the power to be used by the components 106 and 108. The controller 208 can in one embodiment average these sampled values over time to obtain a profile of how the electronic device 100 is interacting with the AC mains 102. For instance, when a high power-consuming AC component is turned on, the controller 208 may detect that the AC mains 102 appears not to be able to keep up, such that the AC mains voltage is sagging as a result of this component consuming power. In response, the controller 208 may decrease the power used by the component in question, so that the AC mains voltage does not sag too much.

In this sense, the controller 208 is able to use the sampled values of the AC mains voltage, the AC mains current, and/or the sampled AC mains power to detect changes in the AC mains voltage that result in particular from causes internal to the electronic device 100, such as power usage by the components 106 and 108. One or more of the AC components 108 in particular may sufficiently load the AC mains 102 such that the AC mains voltage begins to decrease. Upon detecting such a decrease, the controller 208 can appropriately control the AC components 108 so that they do not use as much power.

The power management performed by the controller 208 based on the sampled values of the AC mains voltage, the AC mains current, and/or the sampled AC mains power is thus generally responsive to gradual, as opposed to sudden, changes in the AC mains voltage, the AC mains current and/or the AC mains power. The controller 208 is able to responsively gradually control the DC components 106 and the AC components 108 upon detecting such gradual changes. The AC mains voltage may degrade over time due to a variety of factors, so that the controller 208 responsively decreases power consumption by the higher power-consuming components of the electronic device 100 to ensure that the electronic device 100 continues to operate.

However, the power management performed by the controller 208 based on the sampled values of the AC mains voltage, the AC mains current, and/or the sampled AC mains may not be able to accommodate or compensate for sudden and drastic changes in the AC mains voltage, the AC mains current, and/or AC mains power. Such sudden changes may occur between samples provided to the controller 208. For instance, the controller 208 may sample AC mains voltage three-to-five times per second, but in-between these samples, a sudden drop may occur in the AC mains voltages due to causes external to the electronic device. Such causes may include devices other than the electronic device 100 loading the AC means, such that the AC mains voltage decreases, where these devices may or may not be under the control of the user also controlling the device 100. Other causes, outside the control of the user controlling the electronic device 100, may also result in a sudden drop in AC mains voltage, such as the electricity provider of the AC mains 102 itself not being able to maintain the nominal value of the AC mains voltage within a given threshold.

In these situations, the sudden changes in the AC mains voltage, the AC mains current, and/or the AC mains power means that the gradual power management normally performed by the controller 208 may be insufficient to prevent ungraceful ceasing of operation of the electronic device 100. If the sudden change in the AC mains voltage is drastic enough, the electronic device 100 may be consuming more power than will be able to be shortly provided by the AC mains 102, such that ungraceful cessation of operation of the device 100 will occur before the gradual power management of the controller 208 reduces power consumption by the components 106 and 108. Therefore, this is why the voltage monitor 202 continuously monitors the AC mains voltage, and issues an interrupt to the controller 208 where the AC mains voltage has drastically dropped below a threshold level more than a predetermined number of times.

In response to receiving an interrupt from the voltage monitor 202, the controller 208 may thus perform more drastic power management measures. The threshold against which the voltage monitor 202 continuously monitors the AC mains voltage may be less than the threshold against which the controller 208 monitors the sampled AC mains voltage. As such, generation of an interrupt by the voltage monitor 202 can correspond to the situation where the AC mains voltage has sufficiently dropped that ungraceful stoppage of operation of the electronic device 100 is imminent, and will likely occur before the other, gradual power management of the voltage monitor 202 is able to sufficiently decrease power usage by the components 106 and 108. When the controller 208 receives an interrupt issued by the voltage monitor 202, it may, for instance, turn off one or more of the higher power-consuming components to reduce the power usage of the device 100 by a considerable amount.

Thus, the controller 208 when performing gradual power management may cause the components 106 and 108 of the electronic device 100 to decrease (or increase) power usage, without completely turning them off, in response to gradual reductions in AC mains voltage. By comparison, when performing more drastic power management in response to receiving an interrupt, the controller 208 may completely turn off one or more of the components 106 and 108, in response to a sudden spike downwards in AC mains voltage generating the interrupt. In this sense, the AC mains voltage monitor 202 is able to issue an interrupt in response to at least substantially instantaneous changes in the AC mains voltage, so that the controller 108 is able to react to such AC mains voltage changes where the controller 108 would otherwise be unable to do so by just receiving the sample AC mains voltage.

It is noted that the prior art solution to accommodating or compensating for sudden or drastic changes in the AC mains voltage in particular is to simply increase the rate at which the controller 208 samples data from the voltage monitor 202. However, this solution is disadvantageous as compared to embodiments of the present disclosure for at least two reasons. First, because the controller 208 may inherently be a discrete sampling system, even if its sampling rate of the voltage monitor 202 is increased, there is still the possibility that sudden or drastic changes may occur within the AC mains voltage between samples. Second, increasing the sampling rate may be practically prohibitive, because of other tasks that the controller 208 has to perform. That is, increasing the sampling rate can result in the controller 208 being unable to perform the other tasks for which it is responsible, effectively meaning that the sampling rate of the controller 208 cannot be practically increased to its theoretical limits.

Figure 3A:
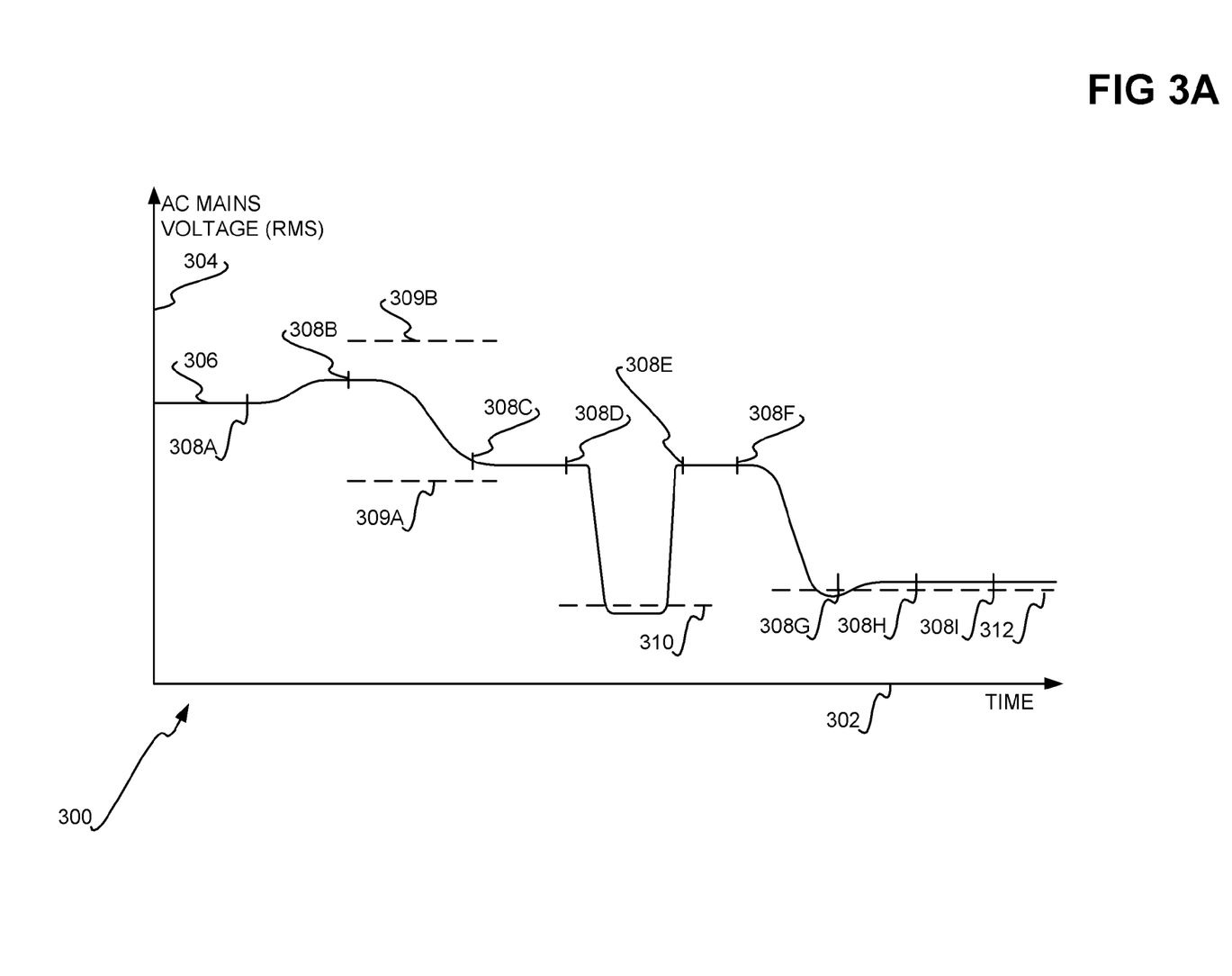
FIGS. 3A and 3B are diagrams of how AC mains voltage can vary over time, in relation to which embodiments of the present disclosure may be performed.

FIG. 3A shows a graph 300 depicting how AC mains voltage may vary over time, according to an embodiment of the present disclosure. In the graph 300, the x-axis 302 denotes time, the y-axis 304 denotes voltage, and the line 306 denotes the root main square (RMS) value of the AC mains voltage. Hash marks 308A, 308B, 308C, 308D, 308E, 308F, 308G, 308H, and 308I, collectively referred to as the hash marks 308, denote when the controller 208 samples the RMS value of the AC mains voltage. Dotted lines 309A and 309B, collectively referred to as the dotted lines 309, denote the lower and upper thresholds of the nominal value for the AC mains voltage. The dotted line 310 denotes the threshold at which the voltage monitor 202 issues an interrupt to the controller 208 when the AC mains voltage drops therebelow for a predetermined number of times. The dotted line 312 denotes the threshold at which the controller 208 begins gradual power management for the electronic device 100 when the AC mains voltage drops therebelow.

Between hash marks 308A through 308D, the AC mains voltage rises and lowers between the thresholds of the nominal value for the AC mains voltage as denoted by the dotted lines 309. Between hash marks 308D and 308E, however, the AC mains voltage drops below the threshold denoted by the line 310. For instance, the AC mains 102 may not provide reliable power, such that the AC mains voltage swings below the threshold of the line 310 three times during this period of time. Because decrease in voltage is in-between the AC mains voltage samplings received by the controller 208 at the times corresponding to the hash marks 308D and 308E, the controller 208 does not itself detect such AC mains voltage drops during its normal sampling.

Figure 3B:
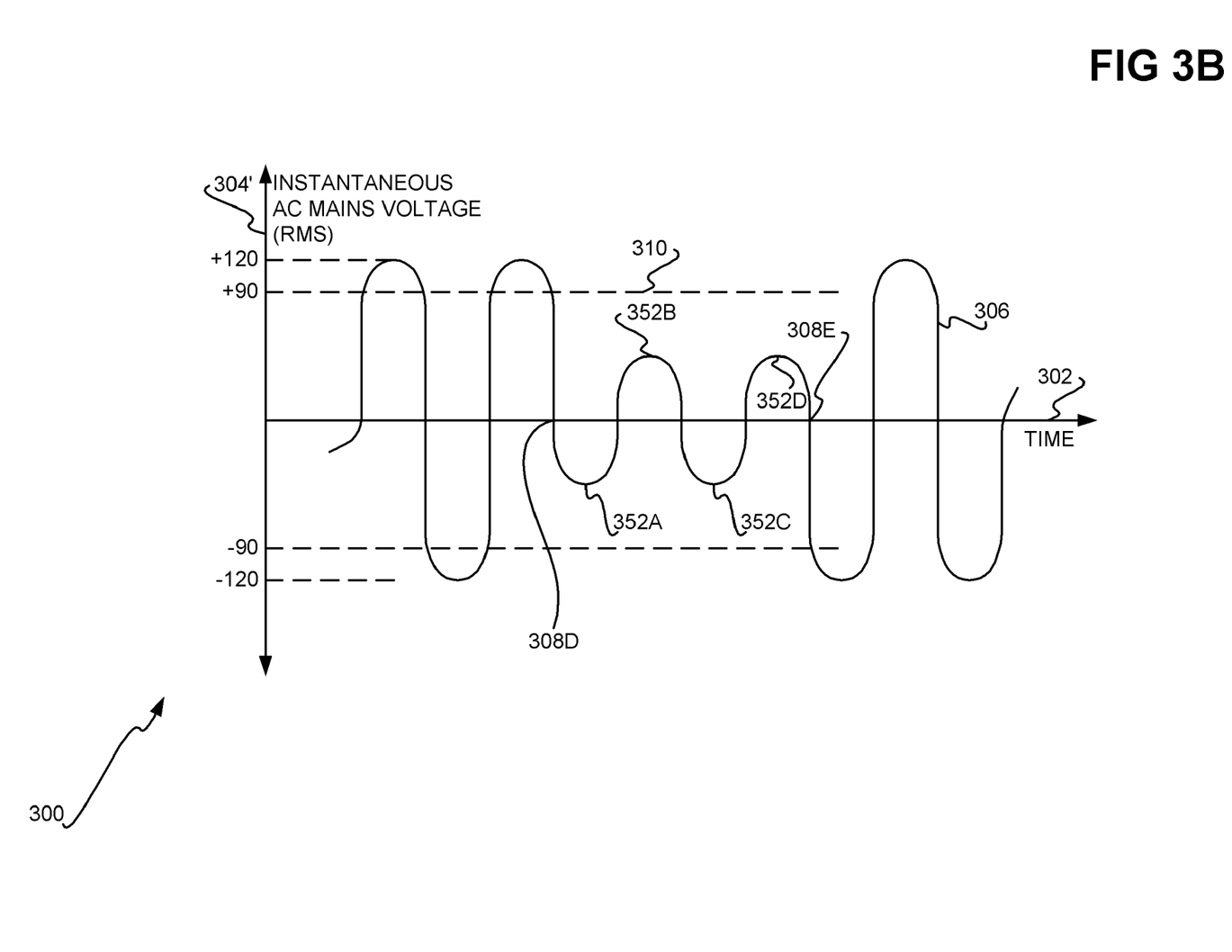

FIG. 3B shows, however, how the voltage monitor 202 is continuously monitoring the AC mains voltage, according to an embodiment of the present disclosure. FIG. 3B specifically shows a portion of the graph 300 of FIG. 3A, specifically the portion of the line 306 between the hash marks 308D and 308E, as well as just before the hash mark 308D and just after the hash mark 308E. As in FIG. 3A, the x-axis 302 in FIG. 3B denotes time. However, whereas the y-axis 304 in FIG. 3A denotes the RMS value of the AC mains voltage, the y-axis 304' in FIG. 3B denotes the instantaneous value of the AC mains voltage as it fluctuates between its nominal positive value and its nominal negative value, scaled in RMS units.

The voltage monitor 202 is continuously monitoring the AC mains voltage. The predetermined number of times in which the AC mains voltage is allowed to drop below the threshold of the line 310 may be three. Therefore, the fourth time the AC mains voltage drops below the threshold, the voltage monitor 202 issues an interrupt. In FIG. 3B, for instance, the threshold may be 90 volts. Between the hash marks 308D and 308E, the RMS value of AC mains voltage fluctuates between a positive value of less than 90 volts and a negative value of greater than −90 volts, instead of between its nominal values of 120 volts and −120 volts. The AC mains voltage thus drops below the threshold four times (i.e., four half cycles, which corresponds to two full cycles) in FIG. 4B, indicated by the reference numbers 352A, 352B, 352C, and 352D.

It is noted that the AC mains voltage dropping below a threshold voltage means that on its upswing the AC mains voltage never exceeds this threshold voltage, and on its downswing the AC mains voltage never exceeds this threshold voltage in an absolute sense, as can be appreciated by those of ordinary skill within the art. That is, as used herein, the AC mains voltage dropping below a threshold voltage means that the absolute value of its positive or negative peak does not exceed the threshold voltage. In FIG. 3B, for instance, the AC mains voltage normally swings between 120 volts and −120 volts, but between the has marks 308D and 308E sags to instead swing between less than 90 volts and greater than −90 volts.

Upon receipt of the interrupt, the controller 208 may perform drastic power management, to compensate for what may be an extended period of time of low AC mains voltage. For instance, the controller 208 may completely shut off one or more of the high-power consuming AC components 108. This ensures that even during this extended period of time of low AC mains voltage, the electronic device 100 is still able to operate without shutting off due to its consuming more power than is available on the AC mains 102.

Referring back to FIG. 3A, at the hash marks 308E and 308F, the controller 208 continues to sample the AC mains voltage, and in the absence of further interrupts received from the voltage monitor 202, may turn on any components that were previously turned off. At hash mark 308G, the controller 208 samples the AC mains voltage at values lower than its own threshold of the line 312, which is higher than the threshold of the line 310 of the voltage monitor 202. In response to such sampling, the controller 208 may begin more gradual power management functionality. For instance, one or more of the high-power consuming AC components 108 may be operated at a reduced power level, so that less power is consumed by the electronic device 100 as a whole. As a result, at the hash marks 308H and 308I, the AC mains voltage rises to a level just above the threshold of the line 310.

Figure 4:
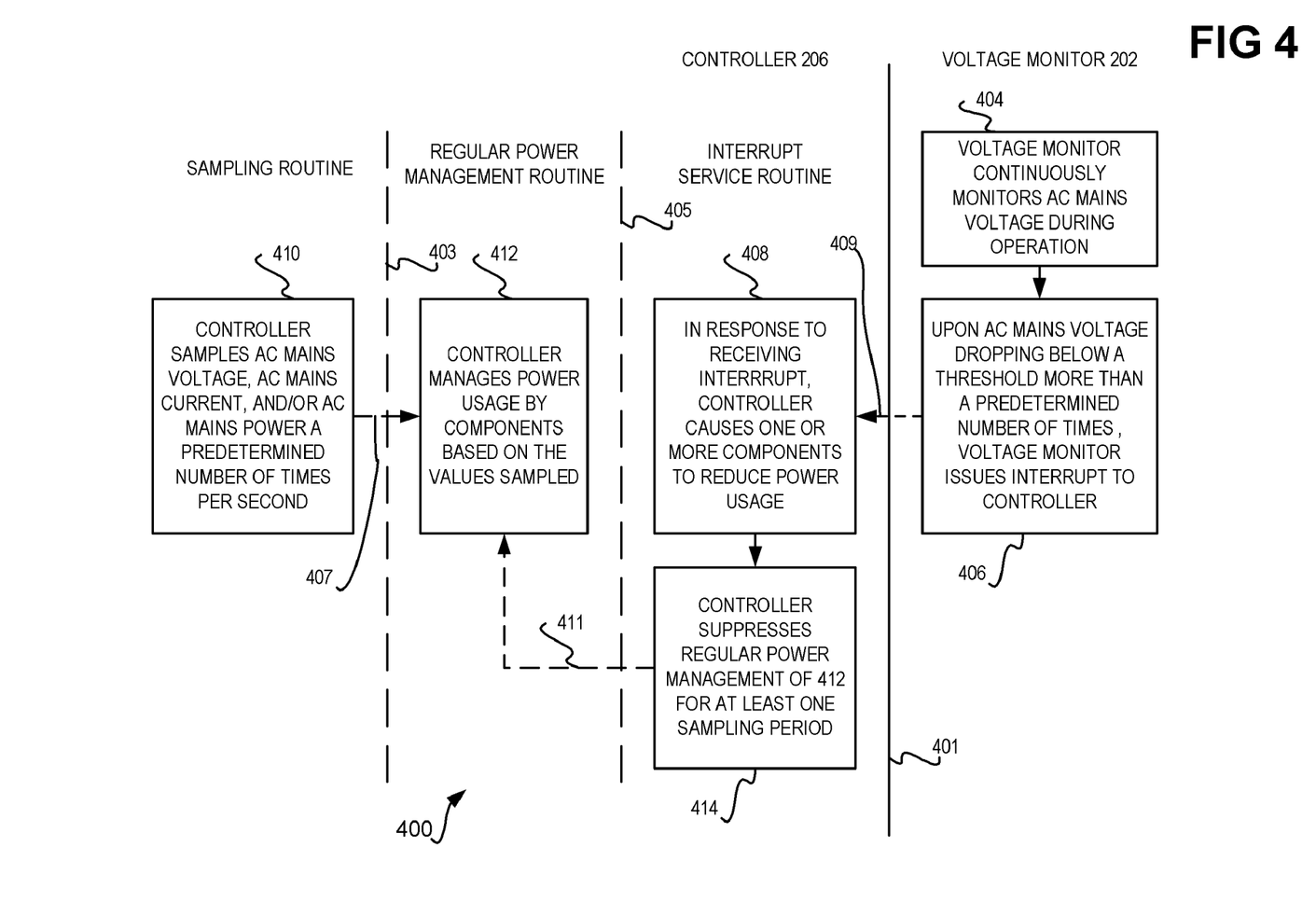
FIG. 4 is a flowchart of a method for managing power, according to an embodiment of the present disclosure.

FIG. 4 shows a method 400 for managing power usage by the electronic device 100, according to an embodiment of the present disclosure. The method 400 is performed by the voltage monitor 202 and the controller 206. Specifically, the parts of the method 400 to the right of the solid line 401 are performed by the voltage monitor 202, and the parts of the method 400 to the left of the solid line 401 are performed by the controller 206. The parts of the method 400 performed by the voltage monitor 202 and the parts performed by the controller 206 are performed substantially concurrently. Furthermore, the controller 206 performs its parts of the method 400 within three substantially independent routines: a sampling routine to the left of the dotted line 403, a regular power management routine between the dotted lines 403 and 405, and an interrupt service routine to the right of the dotted line 405.

The three routines performed by the controller 206 can substantially be performed concurrently and/or independently. For example, as will be described, the sampling routine of part 410 can be performed constantly by the controller 206 at regular intervals. Periodically the regular power management routine of part 412 is performed, except when it is suppressed by the interrupt service routine of parts 408 and 414. The interrupt service routine of parts 408 and 414 is performed just when an interrupt has been received from the voltage monitor 202.

In the sampling routine, the controller 208 samples the AC mains voltage, the AC mains current, and/or the AC mains power a predetermined number of times per second (410). In the regular power management routine, the controller 208 manages the power usage of the components 106 and 108 based on the sampled values (412), as indicated by the dotted line 407. The controller 208 may perform more gradual power management, for instance, within the regular power management routine, as has been described. The power management of part 412 is referred to herein as regular, sampled-based power management, in that the power management is performed on the basis of sampled data. (It is noted that in one embodiment, just the AC mains voltage and the AC mains current are sampled in part 410, and the AC mains power is sampled in part 412 separately.)

Concurrently, the voltage monitor 202 continuously monitors the AC mains voltage (404). When the AC mains voltage drops below a threshold more than a predetermined number of times, the voltage monitor 202 issues an interrupt to the controller 208 (406). Receipt of the interrupt, as indicated by the dotted line 409, causes the controller 208 to enter the interrupt service routine, in which it causes one or more of the components 106 and 108 to reduce power usage (408). The power management of part 408 is referred to herein as interrupt-based power management, in that it is performed upon receipt of the interrupt. The controller 208 may perform drastic power management within part 408. While the components 106 and 108 are operating in what can be a significantly reduced power usage mode, the controller 208 suppresses the regular power management routine of part 412 for at least one sampling period (414), as indicated by the dotted line 411.

The controller 208 performs the interrupt-based power management of part 408, and suppresses the regular, sampled-based power management of 412 for at least one sampling period so that the values sampled in part 410 have sufficient time to reflect the fact that the components 106 and 108, for instance, have had their power usage significantly reduced. That is, while the interrupt-based power management of part 408 is occurring, and while the sampled-based power management of part 412 is being suppressed, the sampling of part 410 continues. Once the values sampled in part 410 accurately reflect the current state of power usage by and power supply to the electronic device 100 due to the interrupt-based power management of part 408, part 414 turns off suppression of the sampled-based power management of part 412, and the interrupt-based power management of part 408 ends.

For example, sampled-based power management by the controller 208 in part 412 may ordinarily employ the most recent two data samples taken in part 410. As a result, upon receipt of an interrupt such that interrupt-based power management is performed in part 408, the controller 208 suppresses the sampled-based power management of part 412 for at least two data samples before ceasing the interrupt-based power management of part 408 and allowing the sampled-based power management of part 412 to continue. This suppression enables the controller 208 to take two data samples in part 410 that accurately reflect the state of power relative to the electronic device 100 due to the interrupt-based power management of part 408, so that subsequent sampled-based power management in part 412 appropriately is made on this basis.

We claim:

1. An apparatus, comprising:
an alternating current (AC) mains voltage monitor to continuously monitor AC mains voltage during operation and to issue an interrupt where the AC mains voltage drops below a threshold more than a predetermined number of times; and,
a controller to receive the interrupt and in response to cause one or more components of an electronic device to reduce power usage from the AC mains to compensate for the AC mains voltage dropping below the threshold more than the predetermined number of times, by turning off one or more of the components of the electronic device in response to receiving the interrupt,
wherein the controller is further to receive one or more of sampled AC mains voltage, sampled AC mains current, and sampled AC mains power to manage power usage by the components of the electronic device based on the sampled AC mains voltage, the sampled AC mains current, and/or the sampled AC mains power,
wherein the controller is to receive the sampled AC mains voltage, the sampled AC mains current, and/or the sampled AC mains power a predetermined number of times per second and not continuousy,
and wherein the controller is further to manage power usage in response to receiving one or more of the sampled AC mains voltage, the sampled AC mains current, and the sampled AC mains power by increasing and/or reducing power usage by, but not turning off, one or more of the components of the electronic device.

2. The power-monitoring sub-assembly of claim 1, wherein the AC mains voltage monitor is capable of issuing the interrupt in-between the controller receiving successive samples of the sampled AC mains voltage.

3. The power-monitoring sub-assembly of claim 1, wherein the AC mains voltage monitor is capable of issuing the interrupt in response to at least substantially instantaneous changes in the AC mains voltage that cause the AC mains voltage to drop below the threshold more than the predetermined number of times, such that the controller is otherwise unable to react to at least substantially instantaneous changes in the AC mains voltage by just receiving the sampled AC mains voltage the predetermined number of times per second.

4. The power-monitoring sub-assembly of claim 1, wherein the threshold is a first threshold, and the controller is manage power usage by the components of the electronic device at least where the sampled AC mains voltage is less than a second threshold that is greater than the first threshold in relation to which the AC mains voltage monitor continuously monitors the AC mains voltage.

5. The power-monitoring sub-assembly of claim 1, further comprising:
an AC mains current monitor to monitor AC mains current;
an AC mains power monitor to receive the AC mains voltage from the AC mains voltage monitor and the AC mains current from the AC mains current monitor, and in response to determine AC mains power based thereon,
wherein the controller is to receive the sampled AC mains power from the AC mains power monitor, and the sampled AC mains voltage from the AC mains voltage monitor.

6. The power-monitor sub-assembly of claim 5, wherein the controller is to receive just the sampled AC mains voltage and the sampled AC mains power, and is not to receive the sampled AC mains current.

7. An electronic device comprising:
one or more components, each component using power originating from an alternating current (AC) mains; and,
a power-monitoring sub-assembly to continuously monitor AC mains voltage during operation, to issue an interrupt where the AC mains voltage drops below a threshold more than a predetermined number of times, and to cause one or more of the components to reduce power usage from the AC mains to compensate for the AC mains voltage dropping below the threshold more than the predetermined number of times,
wherein the power-monitoring sub-assembly comprises:
an AC mains voltage monitor to continuously monitor the AC mains voltage and to issue the interrupt where the AC mains voltage drops below the threshold more than the predetermined number of times: and,
a controller to receive the interrupt and in response to cause one or more of the components to reduce power usage from the AC mains to compensate for the AC mains voltage dropping below the threshold more than the predetermined number of times, by turning off one or more of the components in response to receiving the interrupt,
wherein the controller is further to receive one or more of sampled AC mains voltage, sampled AC mains current, and sampled AC mains power to manage power usage by the components of the electronic device, based on the sampled AC mains voltage, the sampled AC mains current, and/or the sampled AC mains power, by increasing and/or reducing power usage by, but not turning off, one or more of the components,
the controller receiving the sampled AC mains voltage, the sampled AC mains current, and/or the sampled AC mains power a predetermined number of times per second and not continuously.

8. The electronic device of claim 7, wherein the AC mains voltage monitor is capable of issuing the interrupt in-between the controller receiving successive samples of the sampled AC mains voltage, and is capable of issuing the interrupt in response to at least substantially instantaneous changes in the AC mains voltage, such that the controller is otherwise unable to react to at least substantially instantaneous changes in the AC mains voltage by just receiving the sampled AC mains voltage the predetermined number of times per second.

9. The electronic device of claim 7, wherein the AC mains voltage monitor is to continuously monitor the AC mains voltage to detect changes to the AC mains voltage resulting from causes external to the electronic device, and
wherein the controller is to receive the sampled AC mains voltage to detect changes to the AC mains voltage resulting from causes internal to the electronic device.

10. The electronic device of claim 7, further comprising a power supply to convert AC provided by the AC mains to direct current (DC),
wherein at least one of the components operates on the DC supplied by the power supply and at least one other of the components operates on the AC supplied by the AC mains.

11. The electronic device of claim 7, wherein the electronic device is an image-forming device, and the components comprise one or more of a fuser, a dryer, and a vacuum.

12. A method comprising:
sampling one or more of alternating current (AC) mains voltage, AC mains current, and AC mains power a predetermined number of times per second, and not continuously;
until an interrupt corresponding to the AC mains voltage as continuously monitored during operation dropping below a threshold more than a predetermined of times,
managing power usage from the AC mains by one or more components of an electronic device based on the AC mains voltage, the AC mains current, and/or the AC mains power as sampled, by increasing and/or reducing power usage by, but not turning off, one or more of the components; and,
in response to receiving the interrupt,
causing one or more of the components of to reduce power usage from the AC mains to compensate for the AC mains voltage dropping below the threshold more than the predetermined number of times, by turning off one or more of the components.

13. The method of claim 12, wherein once sampling of the AC mains voltage, the AC mains current, and/or the AC mains power reflects reduced power usage by the components in response to receiving the interrupt, power from the AC mains is again managed based on the AC mains voltage, the AC mains current, and/or the AC mains power as sampled.

* * * * *

UNITED STATES PATENT AND TRADEMARK OFFICE
CERTIFICATE OF CORRECTION

PATENT NO. : 7,646,110 B2
APPLICATION NO. : 11/552342
DATED : January 12, 2010
INVENTOR(S) : David E. Smith et al.

It is certified that error appears in the above-identified patent and that said Letters Patent is hereby corrected as shown below:

In column 8, line 65, in Claim 1, delete "continuousy" and insert -- continuously --, therefor.

In column 9, line 55, in Claim 7, delete "times:" and insert -- times; --, therefor.

In column 10, line 45, in Claim 12, after "predetermined" insert -- number --.

Signed and Sealed this

Twenty-ninth Day of June, 2010

David J. Kappos
*Director of the United States Patent and Trademark Office*